Oct. 9, 1928.

W. S. WILLIAMSON

SELF CLEANING RAKE

Filed Aug. 17, 1925

1,686,781

INVENTOR
Ward S. Williamson.
BY Walter N. Haskell.
his ATTORNEY

Patented Oct. 9, 1928.

1,686,781

UNITED STATES PATENT OFFICE.

WARD S. WILLIAMSON, OF ROCK FALLS, ILLINOIS.

SELF-CLEANING RAKE.

Application filed August 17, 1925. Serial No. 50,694.

My invention relates to self-cleaning rakes, of that class wherein an accumulation of leaves or other rubbish on the teeth of the rake is automatically removed therefrom in the rearward movement of the rake over the ground. This is accomplished by having the head of the rake mounted so as to be permitted a limited rocking movement in either direction, so as to vary the degree of inclination of the teeth with reference to the ground.

Another purpose of the invention is the provision of means for locking the rake head in a fixed position, to facilitate the use thereof in some operations, such as leveling new ground, breaking clods of earth, and the like.

The device is simple and efficient, and can be adapted to rakes already in use at very little added cost.

Figure 1:
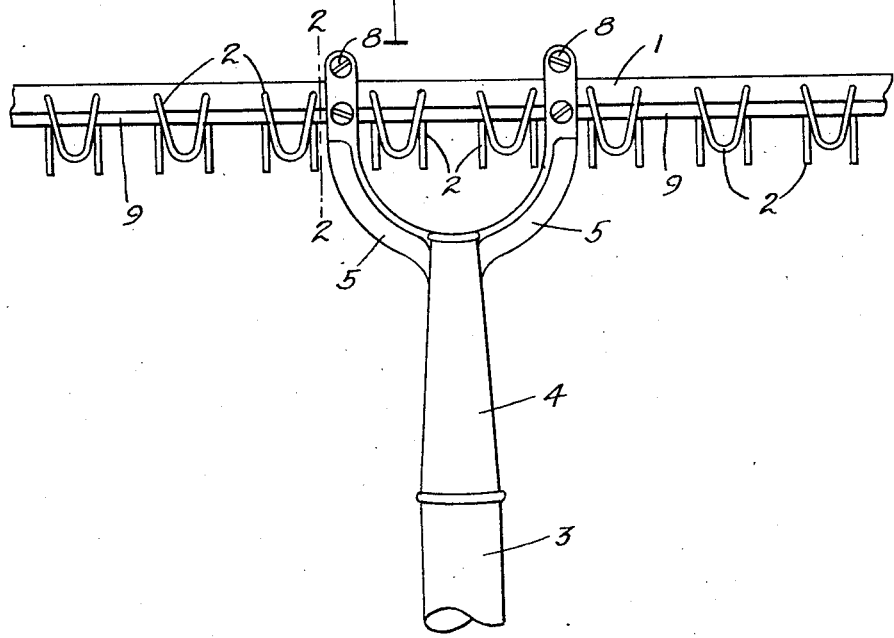
Fig. 1 is a plan view of a rake head in which the invention is embodied.
Figure 2:
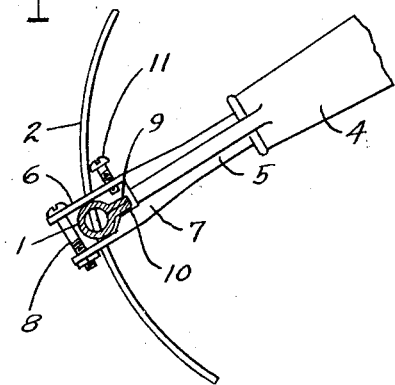
Fig. 2 is a cross-section on the broken line 2—2 of Fig. 1, with the teeth of the rake held in an operative position.

The reference number 1 indicates the head of a rake, and 2 a plurality of teeth of usual double wire formation. 3 is a fragmentary part of a rake handle, fixed in a socket 4, provided with forked arms 5, on the ends of which are spaced jaws 6 and 7, between which the head 1 is rockingly held. The outer ends of said jaws are united by bolts 8, which prevent the release of the head 1, but permit the removal thereof to permit replacement of the teeth or other repairs.

Figure 3:
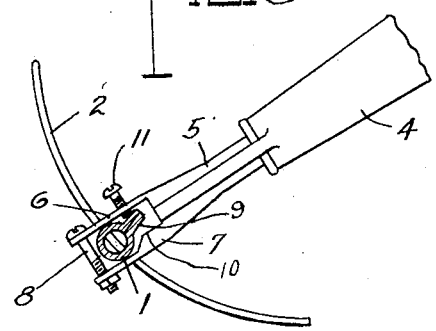
Fig. 3 is a similar view, with the teeth out of operative position.

The head 1 is formed into a flange 9, which limits the rocking movement of the head by a contact with a shoulder 10 in the jaw 7 in one direction, and by a contact with the jaw 6 in the other direction. This results in a change in the position of the teeth 2 from an upright position when the rake is being drawn forwardly, as shown in Fig. 1 to an inclined position upon the rake being moved rearwardly over the ground, as in Fig. 3. In this latter position the friction between the earth and lower ends of the teeth serves to clean such teeth from rubbish which has been collected thereon.

The jaws 6 are shown provided with set-screws 11, at points just above the flange 9, by means of which set-screws the movement of the flange can be regulated, to decrease or increase the movement of such flange. Said set-screws can be turned downwardly to a point to hold the flange in contact with the shoulders 10, so as to hold the head 1 and teeth 2 rigidly in position.

It will be obvious that it is not essential that the rake-head shall be of hollow formation, and that the flanged portion may be limited to those parts of the head which operate in the handle forks. Other changes can be made in the form and arrangement of the parts of the invention without departing from the spirit of the invention.

What I claim, and desire to secure by Letters Patent, is;

A device of the class described, comprising a handle, a frame on one end thereof provided with spaced jaws rigidly united one of which is fitted with a stop and the other with a set-screw adapted for operation in opposition to said stop, and a rake-head rockingly mounted in said jaws, and provided with a plurality of teeth and also provided with a projection positioned between said stop and set-screw and subject to regulation thereby.

In testimony whereof I affix my signature.

WARD S. WILLIAMSON.